United States Patent [19]

Rathgeber

[11] Patent Number: 4,477,018

[45] Date of Patent: Oct. 16, 1984

[54] CONTROL UNIT FOR A HEATING AND/OR AIR CONDITIONING SYSTEM FOR AUTOMOBILES

[75] Inventor: Gerhard Rathgeber, Pliening-Landsham, Fed. Rep. of Germany

[73] Assignee: Bayerische Motoren Werke AG, Fed. Rep. of Germany

[21] Appl. No.: 447,752

[22] Filed: Dec. 7, 1982

[30] Foreign Application Priority Data

Dec. 24, 1981 [DE] Fed. Rep. of Germany ....... 3151255

[51] Int. Cl.³ ............................ F24F 7/00; F24F 3/00
[52] U.S. Cl. ..................................... 236/1 B; 236/49; 165/22
[58] Field of Search ............................. 98/2.01, 2.11; 236/91 G, 91 R, 91 E, 91 F, 1 B, 49, 78 B; 165/22; 62/203

[56] References Cited

U.S. PATENT DOCUMENTS 3,170,630  2/1965  Chadwick ........................... 236/1 B
4,058,255  11/1977  Linder et al. ....................... 236/91 F

FOREIGN PATENT DOCUMENTS 0013298  7/1980  European Pat. Off. .

Primary Examiner—Harry B. Tanner
Attorney, Agent, or Firm—Craig & Burns

[57] ABSTRACT

In a control unit for a heating and/or air conditioning for automobiles with individual temperature control elements for two areas and with a common inside temperature sensor, the temperature of both areas can be adjusted or changed individually and independently of each other by directly activating both control elements by means of associated delay-value setters and by delaying the signal modification at the input of a common controller through the desired time setters for a sufficient time until it is offset by a corresponding signal modification of the inside temperature sensor.

9 Claims, 7 Drawing Figures

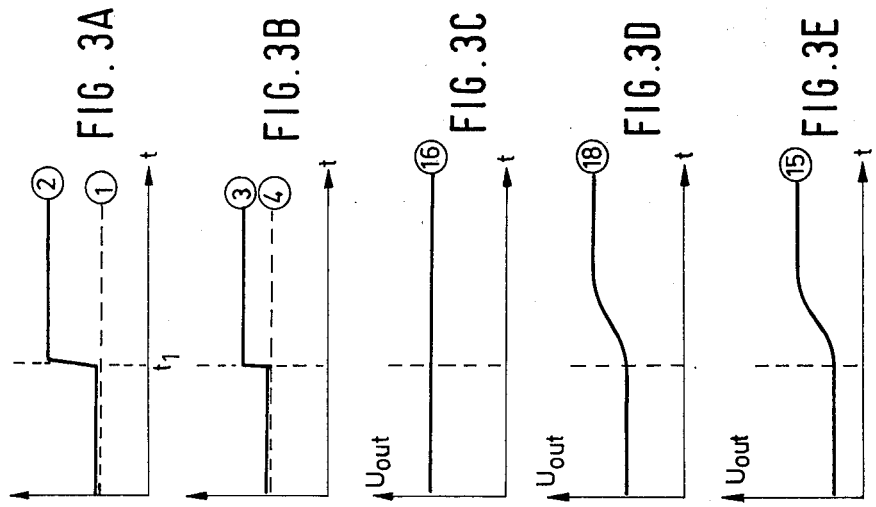
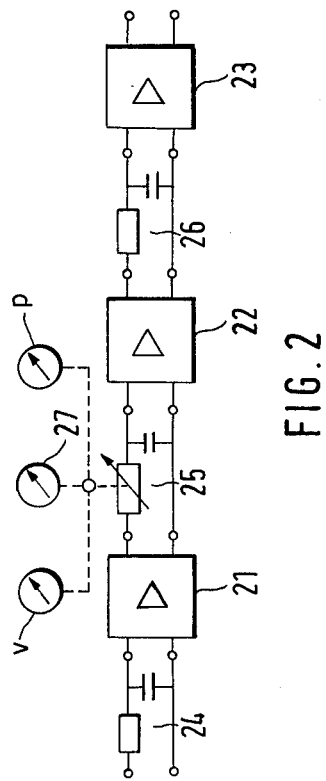

CONTROL UNIT FOR A HEATING AND/OR AIR CONDITIONING SYSTEM FOR AUTOMOBILES

The invention relates to a control unit for a heating and/or air conditioning system for automobiles with two heat exchangers assigned to two different areas of the interior, called heat exchanger areas, each of which is controlled or switched on by a control element assigned to a corresponding desired-value setter, having a controller which governs the control elements and to the input of which are connected a single inside temperature sensor and the two desired-value setters, and having means, when adjusting the desired-value setters, for preventing the control element for the other heat exchanger from being adjusted.

In this type of control unit, such as well known and exemplified by EP-A-No. 13 298, both control elements are indirectly governed by the controller. Through crossover coupling of the two desired-value setters and of the two control elements, it is possible to change one desired-value setter without affecting the heat exchanger for the other area.

However, this undesired adjustment of the control element for the heat exchanger for the other area is avoided only when one of the two desired-value setters is changed. The change of the desired-value setter results in a corresponding change of temperature in the associated area. Thus, the common inside temperature sensor imparts to the controller a change of temperature in the same sense. The controller governs both control elements in the same sense and in such a way as to compensate, at least in part, for this change of temperature. Particularly for the area whose desired-value setter has not been changed and whose temperature has, at first, remained the same, a change of temperature results after a certain period of time and which is opposite to that of the other area. The duration, after which this change of temperature occurs, is essentially dependent upon the vehicle specific conditions.

The invention is directed to creating a control unit of the type referred to above which achieves an individual adjustment of the temperature of one area without affecting the temperature of the other area.

The solution to this problem according to the invention is characterized by a direct activation of the control elements, by the associated desired-value setters, and by delay means for feeding forward to the controller the change of the desired value setters.

The direct activation of the control elements enables an individual temperature selection in this area. The delay means serve for the isolation or decoupling of the desired-value setters in one area from the control elements for the other area. A feature of the invention consists in compensating the effect on the inside temperature sensor resulting from a desired change of temperature in one area by a change at the controller input originating in the adjusted desired-value setter, the change being substantially identical in duration and magnitude, but opposite in sense. Thus, the controller output remains largely unchanged, at least with regard to time.

The operating principle of a delay network as part of the invention, particularly the actual effective duration and the actual effective intensity, primarily depends upon the specific conditions of the car interior.

In a first approximation, the delay can have a constant time value. Alternatively, the invention contemplates an improvement wherein a delay is effected with a variable duration.

The change in this duration can occur as a function of the various influencing variables of the control unit, where the heating capacity must be mentioned as a dominant factor.

The heating capacity, in turn, depends, first of all, upon the temperature and the dimensions of the heat exchanger surfaces. Assuming a saturation operation of the heat exchangers, which occurs after a short vehicle operation, the heating capacity is essentially dependent upon the volume of air conducted over the heat exchangers. If the delay time is made dependent, exclusively or essentially, upon this volume of air, this will enable a virtually complete adaptation at the controller input of the two changes brought about by the desired-value setter and the inside temperature sensor.

The volume of air conducted over the heat exchangers can be derived from the adjustment of an air volume selector.

Accordingly, it is an object of the invention to provide an improved control unit for a heating and/or air conditioning system for automobiles.

It is another object of the invention to create a control unit of the type which achieves an individual adjustment of the temperature of one area without affecting the temperature of a second area.

It is another object of the invention to achieve an individual adjustment of the temperature of one area without affecting the temperature of another area employing a delay means for feeding forward to a controller, the change of a desired-value setter.

It is another object of the invention to provide a control unit for a heating and/or air conditioning system for automobiles with two heat exchangers assigned to two different areas of the interior, called heat exchanger areas, each of which is controlled or switched on by a control element assigned to a corresponding desired-value setter, having a controller which governs the control elements and to the input of which are connected a single inside temperature sensor and said two desired-value setters, and having means, when adjusting the desired-value setters, for preventing the control element for the other heat exchanger from being adjusted, wherein direct activation of the control elements is effected by the associated desired-value setters in conjunction with a delay mechanism for feeding forward the change of the desired-value setter to the controller.

It is another object of the invention to provide a control unit for a heating and/or air conditioning system for automobiles which employs a delay mechanism subject to a delay time which may be one of a constant time value or a variable time value.

It is another object of the invention to provide a control unit for a heating and/or air conditioning system for automobiles employing a delay mechanism wherein the delay time is a function of one of the heating capacity and the volume of air conducted over the heat exchanger.

It is a further object of the invention to provide a control unit for a heating and/or air conditioning system for automobiles employing a delay mechanism wherein the delay time can be adjusted by means of an air-volume selector.

These and other objects, features and advantages of the present invention will become more apparent from the following description when taken in connection with the accompanying drawings which show, for the purposes of illustration only, one embodiment in accordance with the present invention, and wherein:

FIG. 2 is a circuit design of the delay network of FIG. 1, and

FIGS. 3a–3e show the performance of the control unit with the aid of various diagrams.

Figure 1:
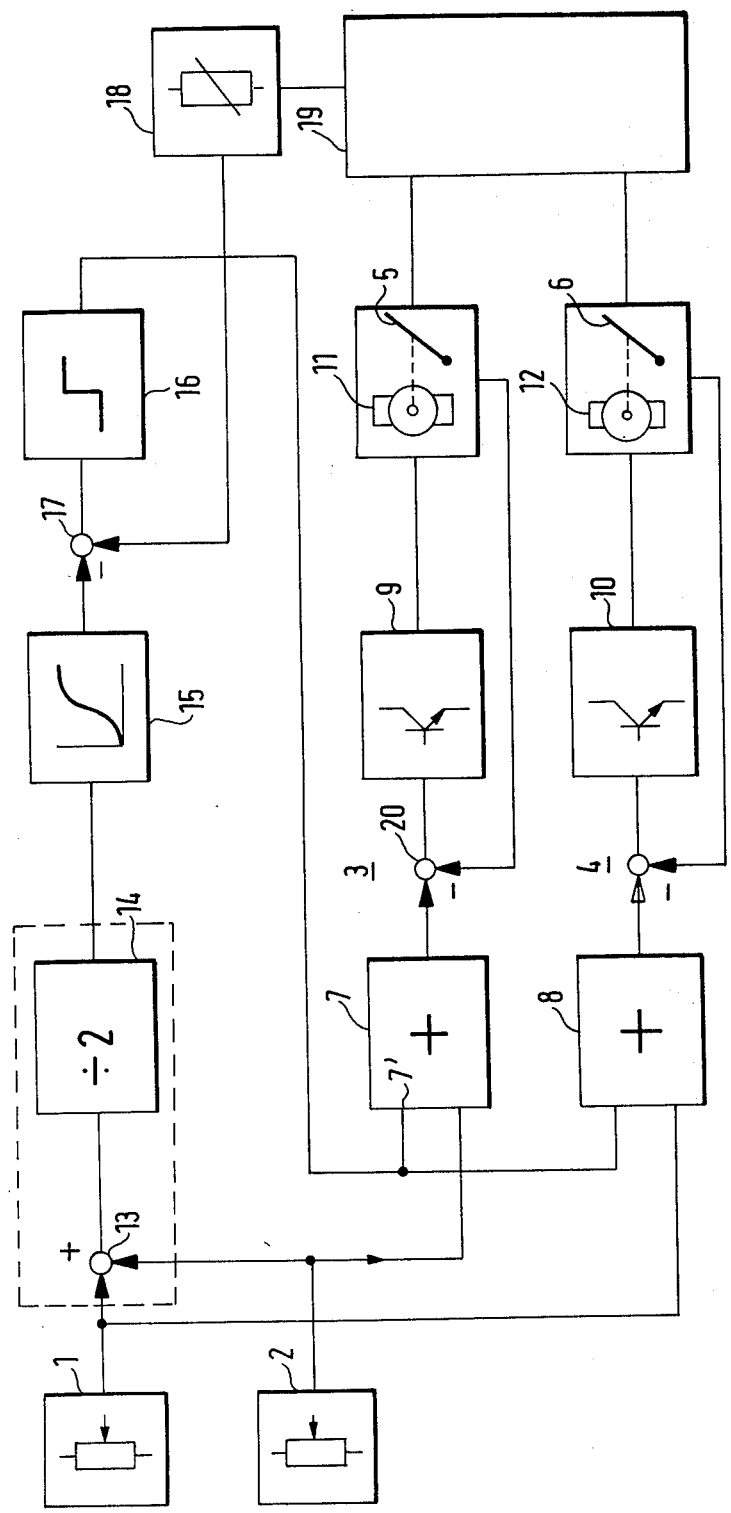
FIG. 1 shows a block diagram of the control unit embodying the invention.

The control unit shown in FIG. 1 contains two desired-value setters 1 and 2 which are assigned to two areas of the car interior, e.g., to the left and to the right side. These desired-value setters 1 and 2 directly affect the control elements 3 and 4 for temperature mixing dampers 5 and 6 which are assigned to heat exchangers (not shown) in the two areas and which individually adjust the volume of air conducted over the heat exchangers or moving past them.

The control elements 3 and 4 consist of summing networks 7 and 8 and engine controls 11 and 12 for the temperature mixing dampers 5 and 6.

The desired value setters 1 and 2 are further connected via a signal averaging circuit consisting of summing point 13 and half adder 14, and via a delay network 15 to a controller 16, the output signal of which is routed to the summing networks 7 and 8. At the input of controller 16 there is connected via a subtraction point 17 an inside temperature sensor 18 place at a central location of the passenger compartment 19.

Assuming a situation in which the controller 16 is not operating dynamically, the desired-value setter for "right" the right hand side, i.e., the desired-value setter 2, is to be adjusted in a well-defined manner, for example, to increase the temperature on the right side. This activates the control element 3 immediately and the temperature mixing damper 5 is moved by the servomotor 11 in such a way that the temperature mixing damper 5 conducts more air over the associated heat exchanger. The adjustment of the temperature mixing damper 5 is taken back to a subtraction point 20 between the summing network 7 and the engine control 9 and is in this way adjusted in the manner provided by the summing network 7 or by the desired-value setter 2, as the case may be.

Summing point 13 represents circuitry known to those skilled in the art. Analog signals are generated by desired-value setters 1 and 2, an analog summing circuit may be used for 13, of a type well known to those skilled in the art and which does not by its particular structure consititute the invention here disclosed.

By the same token, subtraction points such as 17 and 20 may take the form of conventional analog subtractors known to those skilled in the art.

The change of the desired-value setter 2 also reaches the controller 16 via the signal averager 13, 14, and the delay network 15. The operating principle of the delay network 15 is such that this change is transmitted to the subtraction point 17 only when the temperature in the right side has increased noticeably by changing the adjustment of the temperature mixing damper 6 for the inside temperature sensor 18 and is also transmitted to the subtraction point 17 by the latter. The inside temperature sensor 18 determines essentially the mean value or the temperatures in both areas. A signal is formed by the signal averager 14 of the output signals of the two desired-value setters 1 and 2. The signal modification at the outputs of delay network 15 and inside temperature sensor 18 occurring at the subtraction point 17 is at least approximately the same during the entire change. Thus, the controller 16 remains unchanged on the input side and, therefore, does not affect the two control elements 3 and 4 even during the entire change of temperature in the right area. Thus, it is possible to change the temperature on one side without affecting the temperature on the other side.

The operation of controller 16 results in a corresponding exertion of influence on both control elements 3 and 4 only when the inside temperature sensor 18 indicates a change of temperature which is not offset by a corresponding change of one of the two desired-value setters 1 and 2, or both.

The circuit design of the delay network 15 shown in FIG. 2 consists essentially of three amplifiers 21, 22 and 23, and associated RC networks 24, 25 and 26, with which the time response of the control elements 3 or 4 of the passenger compartment as controlled system and of the inside temperature sensor 18 are simulated.

The RC networks 24, 25 and 26 consist each of a resistor and a capacitor, where the resistor of the RC network 25 is variable and is adjusted in accordance with the position of an air volume selector wheel (blower stage selector) of the system. Generally, a blower stage switch 27 is used for this purpose, taking the other influencing variables back pressure and road speed duly into account.

For this purpose, the switch 27 may be continuously responsive to a signal representing vehicle speed as sensed by a speedometer, v and/or a signal representing sensed engine back pressure, p. In this way, it is possible, during saturation operation of the heat exchangers, to consider essentially only temperature responses of the interior which are dependent upon the volume of air and, thereby, the heating capacity. If this volume of air is large, the area concerned, upon adjustment of the associated desired-value setter 1 or 2, changes its temperature more rapidly than if the volume of air is small. Every voltage variation at the input of the chain of amplifiers 21–23, which results in the output voltage as the output signal of the signal averagers 13, 14 in FIG. 1, is delayed in the amplifier chain in the same way in which the change of temperature in the passenger compartment 19 transmitted to the subtraction point 17 by the inside temperature sensor 18 exerts an influence.

This effect is illustrated schematically with the aid of the diagrams of FIGS. 3a–3e. Assuming the same adjustment setting of both desired-value setters 1 and 2 initially, the desired-value setter 2 for the right side is to be changed with the object of increasing the temperature in this area. In this way, the output signal of the desired-value setter 2 shows the jump characteristic represented in FIG. 3a, while the dash-dotted output signal of the desired value setter 1 remains unchanged.

The control elements 3 and 4 receive at their input a signal which, under the supposed compensation of the two signal modifications occurring at the subtraction point 17, is determined solely by adjusting the desired-value setters 1 and 2 and, thus, likewise shows a corresponding jump function for the control element 3 and a straight course for the control element 4 shown by a broken line as shown in FIG. 3b.

Assuming this, the controller 16 remains unchanged, FIG. 3c, on the input side during the entire time when the temperature changes in the right area and even thereafter, so that controller 16 delivers an output signal which is constant without additional parasitic effects for the temperature of the passenger compartment 19 received by the inside temperature sensor 18.

In the case of the single-sided adjustment concerned, that is, the adjustment solely of the desired-value setter 2, the inside temperature sensor 18 delivers an output signal, which is shown in the FIG. 3d and which is indicated by a rise following adjustment of the desired-value setter 2 until a new level is reached on completion of the temperature change in the right area.

Finally, FIG. 3e shows the operating principle of the delay network 15. The output voltage delivered by the delay network 15 to the subtraction point 17 equals that of the inside temperature sensor 18 delivered to subtraction point 17 and is likewise indicated by a corresponding rise between the output level and the final level.

As can be seen in FIGS. 3d and 3e, the output signals of the inside temperature sensor 18 and of the delay network 15 cancel each other out in the case under consideration, so that the controller input 16 remains unaffected. The adjustment of one of the desired-value setters 1 or 2, or both together, assuming the delay network 15 is ideally matched and there are no additional nuisance effect, merely leads to the direct activation of the control elements 3 and 4 without additional influence on the controller 16.

Thus, the invention actually enables an individual adjustment of the temperatures in two areas of the passenger compartment independent of one another, despite the fact that there is only one inside temperature sensor 18. This isolation is maintained even after the change of temperature in one area, or both, has been completed.

While I have shown and described only one embodiment in accordance with the present invention, it is understood that the same is not limited thereto but is susceptible to numerous changes and modifications as known to one having ordinary skill in the art, and I therefor do not wish to be limited to the details shown and described herein, but intend to cover all such modifications as are encompassed by the scope of the appended claims.

I claim:

1. A control unit for a system for one of heating and air conditioning a vehicle with first and second heat exchangers respectively heating different areas of the vehicle interior,
    first and second desired value setting means respectively generating first and second desired value signals,
    first and second control elements respectively controlling said first and second heat exchangers in response to respective first and second desired value signals,
    means for sensing at least a single temperature of the vehicle interior,
    a controller means responsive to said means for sensing and to said first and second desired value signals for delayed modifying of the thermal output of the first and second heat exchangers only after receipt of a signal from said means for sensing representing a change in temperature of said interior which is not offset by a corresponding change of at least one of said first and second desired value setting means.

2. The control unit as set forth in claim 1, wherein the delay time has a constant time value.

3. The control unit as set forth in claim 1, wherein the delay time has a variable time value.

4. The control value as set forth in claim 3, wherein said first and second heat exchanger respectively comprises blowers and the delay time is a function of the volume of air processed by at least one of said blowers.

5. The control unit as set forth in claim 4, wherein the delay time is a function of the volume of air conducted over at least one heat exchanger.

6. The control unit as set forth in claim 5, wherein the delay time can be adjusted by means of an air volume selector.

7. A control unit for a system for one of heating and air conditioning an automobile with first and second heat exchangers for first and second areas of the automobile interior, comprising
    first and second control element means for respectively controlling said first and second heat exchangers,
    sensing means for generating a signal representative of the temperature of said areas,
    first and second value setter means for adjusting the magnitude of first and second input signals
    means responsie to input signals received from the first and second value setters and to the signal representative of temperature for modifying the thermal output of the first and second heat exchangers only after receipt of a signal from said sensing means representing a change in temperature of said areas which is not offset by a corresponding change of at least one of said first and second value setter means.

8. A control unit in accordance with claim 7, wherein said means responsive to inputs from the first and second value setters comprises
    means for generating an averaging signal in response to input from the first and second value setters,
    means for providing a delayed averaging signal,
    means for combining the delayed averaging signal and the signal representative of temperature, and
    controller means responsive to the means for combining for providing an input signal to said first and second control element means.

9. A control unit in accordance with claim 8, wherein the means for providing a delayed averaging signal comprises
    means for controlling the length of the delay period in accordance with at least one of engine back pressure and vehicle speed.

* * * * *